US012654691B2

(12) United States Patent
Gideon et al.

(10) Patent No.: US 12,654,691 B2
(45) Date of Patent: Jun. 16, 2026

(54) SYSTEMS AND METHODS FOR PREDICTING VEHICLE TRAJECTORIES BASED ON DRIVER AWARENESS

(71) Applicant: Toyota Research Institute, Inc., Los Altos, CA (US)

(72) Inventors: John H. Gideon, Cincinnati, OH (US); Guy Rosman, Cambridge, MA (US); Simon A.I. Stent, Cambridge, MA (US); Kimimasa Tamura, Cambridge, MA (US); Abhijat Biswas, Cambridge, MA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 177 days.

(21) Appl. No.: 18/595,637

(22) Filed: Mar. 5, 2024

(65) Prior Publication Data

US 2025/0121819 A1     Apr. 17, 2025

Related U.S. Application Data

(60) Provisional application No. 63/589,508, filed on Oct. 11, 2023.

(51) Int. Cl.
B60W 50/00          (2006.01)
B60W 30/09          (2012.01)
(Continued)

(52) U.S. Cl.
CPC ........ B60W 30/09 (2013.01); B60W 30/0956 (2013.01); B60W 40/08 (2013.01);
(Continued)

(58) Field of Classification Search
CPC .. B60W 30/09; B60W 30/0956; B60W 40/08; B60W 50/0097; B60W 2040/0818;
(Continued)

(56) References Cited

U.S. PATENT DOCUMENTS 6,496,117 B2 * 12/2002 Gutta ..................... G06V 40/18
                                                           340/576
10,836,309 B1    11/2020 Trundle et al.
(Continued)

FOREIGN PATENT DOCUMENTS

EP          2201496 B1    5/2018
EP          3722908 B1    11/2022
WO      2022224173 A1    10/2022

OTHER PUBLICATIONS

Chen et al. "MIRROR: Differentiable Deep Social Projection for Assistive Human-Robot Communication", arXiv preprint arXiv:2203. 02877. 2022.
(Continued)

*Primary Examiner* — Daniel M. Robert
(74) *Attorney, Agent, or Firm* — Christopher G. Darrow; Darrow Mustafa PC

(57)          ABSTRACT

Systems, methods, and other embodiments described herein relate to predicting future trajectories of ado vehicles and an ego vehicle based on the awareness of the driver of the ego vehicle towards the ado vehicles. In one embodiment, a method includes determining an awareness of a driver of an ego vehicle to ado vehicles in the vicinity of the ego vehicle. The method also includes altering track data of ado vehicles based on a lack of awareness of the driver towards the ado vehicles. The method also includes transmitting altered track data of the ado vehicles to a prediction module. The prediction module predicts future trajectories of the ado
(Continued)

vehicles and the ego vehicle based on the altered track data and an ego vehicle track data.

20 Claims, 7 Drawing Sheets

(51) Int. Cl.
  *B60W 30/095* (2012.01)
  *B60W 40/08* (2012.01)
(52) U.S. Cl.
  CPC . *B60W 50/0097* (2013.01); *B60W 2040/0818* (2013.01); *B60W 2040/0872* (2013.01); *B60W 2540/221* (2020.02); *B60W 2540/225* (2020.02); *B60W 2540/229* (2020.02); *B60W 2554/4044* (2020.02); *B60W 2554/4045* (2020.02); *B60W 2556/10* (2020.02)
(58) Field of Classification Search
  CPC ... B60W 2040/0872; B60W 2540/221; B60W 2540/225; B60W 2540/229; B60W 2554/4044; B60W 2554/4045; B60W 2556/10
  See application file for complete search history.

(56) References Cited

U.S. PATENT DOCUMENTS

| | | | |
|---|---|---|---|
| 11,628,858 B2 | 4/2023 | Jiang et al. | |
| 2010/0033333 A1* | 2/2010 | Victor | A61B 5/7264 |
| | | | 340/576 |
| 2011/0169625 A1* | 7/2011 | James | B60W 30/095 |
| | | | 340/439 |

| | | | |
|---|---|---|---|
| 2020/0402267 A1* | 12/2020 | Hato | B60K 37/20 |
| 2021/0065066 A1 | 3/2021 | Xue et al. | |
| 2022/0410908 A1 | 12/2022 | Molin et al. | |
| 2023/0211498 A1 | 7/2023 | Hiraoka et al. | |

OTHER PUBLICATIONS

Liang et al. "Combining cognitive and visual distraction: Less than the sum of its parts", Accident Analysis & Prevention 42.3. pp. 881-890. 2010.

Mofid et al. "Keep Your AI-es on the Road: Tackling Distracted Driver Detection with Convolutional Neural Networks and Targeted Data Augmentation", arXiv preprint arXiv:2006.10955. 2020.

Choe et al. "Counterfactually Comparing Abstaining Classifiers", arXiv preprint arXiv:2305.10564. 2023.

Ledezma et al. "Implementing a Gaze Tracking Algorithm for Improving Advanced Driver Assistance Systems", Electronics 10.12. 2021.

Gopinath et al. "MAAD: A Model and Dataset for "Attended Awareness" in Driving", Proceedings of the IEEE/CVF International Conference on Computer Vision. 2021.

Doshi et al. "On the Roles of Eye Gaze and Head Dynamics in Predicting Driver's Intent to Change Lanes", IEEE Transactions on Intelligent Transportation Systems 10.3. 2009.

Wu et al. "Gaze-based Intention Anticipation over Driving Manoeuvres in Semi-Autonomous Vehicles", 2019 IEEE/RSJ International Conference on Intelligent Robots and Systems (IROS). IEEE, 2019.

Wu et al. "Toward an Adaptive Situational Awareness Support System for Urban Driving." 2022 IEEE Intelligent Vehicles Symposium (IV). 2022.

Ahlstrom et al. "Towards a Context-Dependent Multi-Buffer Driver Distraction Detection Algorithm", IEEE transactions on intelligent transportation systems 23.5. 2021.

* cited by examiner

SYSTEMS AND METHODS FOR PREDICTING VEHICLE TRAJECTORIES BASED ON DRIVER AWARENESS

CROSS-REFERENCE TO RELATED APPLICATIONS

This application claims benefit of U.S. Provisional Application No. 63/589,508, filed on, Oct. 11, 2023, which is herein incorporated by reference in its entirety.

TECHNICAL FIELD

The subject matter described herein relates, in general, to predicting vehicle trajectories and, more particularly, to predicting ado and ego vehicle trajectories based on the attention a driver of the ego vehicle pays toward the ado vehicle(s).

BACKGROUND

Vehicles may be equipped with systems that aid the driver of the vehicle to ensure a safe driving experience and that promote the safety of the actors (e.g., pedestrians, bicyclists, and other motorists) in the vicinity of the vehicle. For example, a vehicle may be equipped with an automated driving module that may, in part, control one or more vehicle systems (e.g., propulsion system, braking system, steering system, and throttle system, among others) that control the operation of the vehicle to avoid potentially dangerous situations such as a collision with another vehicle. For example, to avoid a rear-end collision with another vehicle, the automated driving module may apply brakes to stop the ego vehicle.

As another example, the vehicle may include a notification system that notifies the ego vehicle driver of an impending danger. For example, the ego vehicle may include sensors (e.g., light detection and ranging (LiDAR) and cameras) that facilitate perceiving other vehicles, obstacles, pedestrians, and additional aspects of a surrounding environment. Relying on this sensor data, a notification system may generate a visual or audio warning/message when another vehicle is within a threshold distance from the ego vehicle that could result in a potential collision, thus prompting the ego vehicle driver to take certain remedial action.

SUMMARY

In one embodiment, example systems and methods relate to a manner of improving the prediction of vehicle trajectories by considering a driver's awareness of, and/or attention to, other vehicles in their vicinity.

In one embodiment, a trajectory prediction system for awareness-based vehicle trajectory prediction is disclosed. The trajectory prediction system includes one or more processors and a memory communicably coupled to the one or more processors. The memory stores instructions that, when executed by the one or more processors, cause the one or more processors to determine an awareness of a driver of an ego vehicle to an ado vehicle in a vicinity of the ego vehicle. The memory also stores instructions that, when executed by the one or more processors, cause the one or more processors to alter past track data of the ado vehicle based on a lack of awareness of the driver towards the ado vehicle. The memory also stores instructions that, when executed by the one or more processors, cause the one or more processors to transmit altered track data of the ado vehicle to a prediction module. The prediction module predicts future trajectories of the ado vehicle and the ego vehicle based on the altered track data and ego vehicle track data.

In one embodiment, a non-transitory computer-readable medium for predicting vehicle trajectories of an ado and ego vehicle based on the awareness of the driver of the ego vehicle to the ado vehicle and including instructions that, when executed by one or more processors, cause the one or more processors to perform one or more functions is disclosed. The instructions include instructions to determine an awareness of a driver of an ego vehicle to an ado vehicle in a vicinity of the ego vehicle. The instructions also include instructions to alter past track data of the ado vehicle based on a lack of awareness of the driver towards the ado vehicle. The instructions also include instructions to transmit altered track data of the ado vehicle to a prediction module. The prediction module predicts future trajectories of the ado vehicle and the ego vehicle based on the altered track data and ego vehicle track data.

In one embodiment, a method for predicting vehicle trajectories of an ado and ego vehicle based on the awareness of the driver of the ego vehicle to the ado vehicle is disclosed. In one embodiment, the method includes determining an awareness of a driver of an ego vehicle to an ado vehicle in a vicinity of the ego vehicle. The method also includes altering past track data of the ado vehicle based on a lack of awareness of the driver towards the ado vehicle. The method also includes transmitting altered track data of the ado vehicle to a prediction module. The prediction module predicts future trajectories of the ado vehicle and the ego vehicle based on the altered track data and ego vehicle track data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

3

Figure 3:
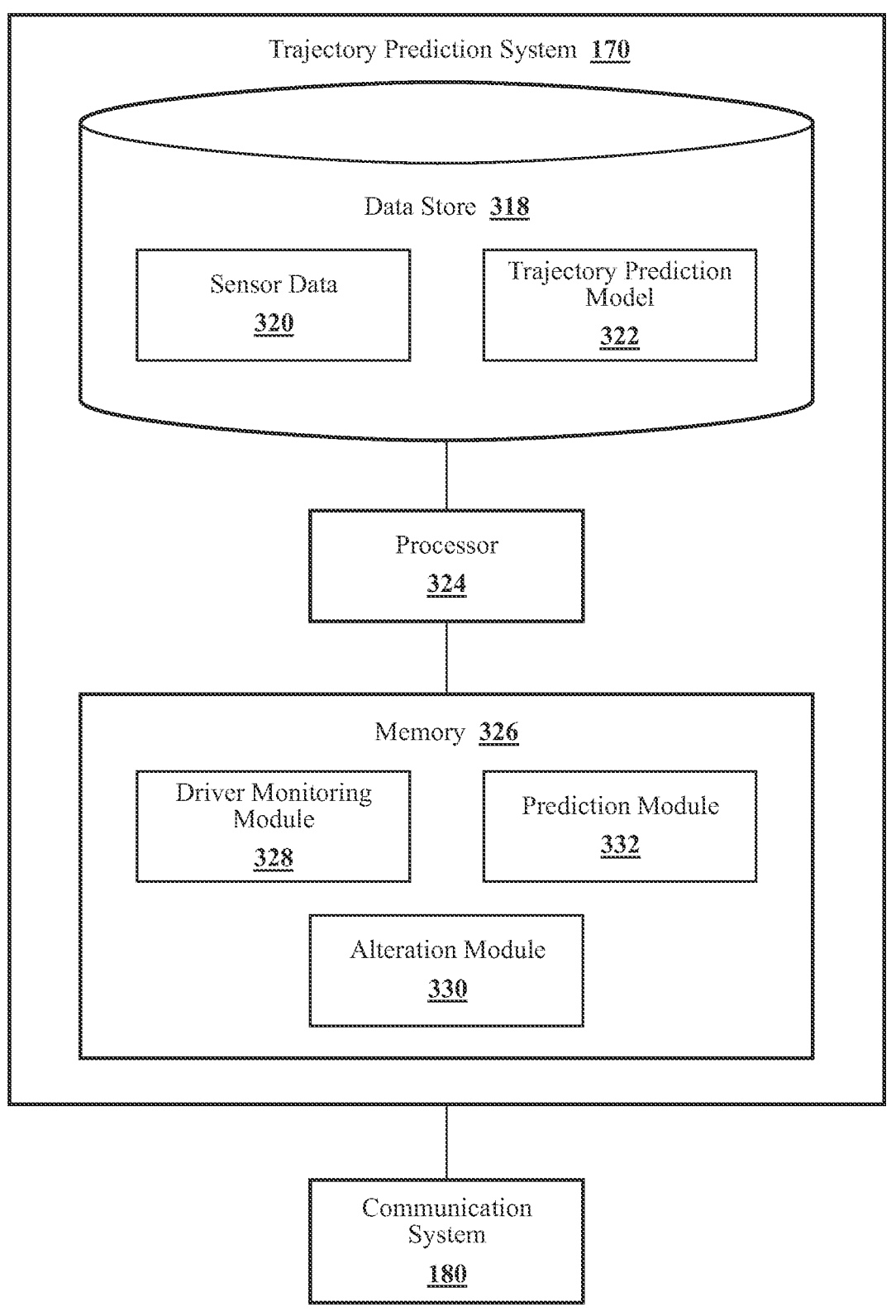
FIG. 3 illustrates one embodiment of a trajectory prediction system that is associated with generating driver awareness-based vehicle trajectory predictions.
Figure 8:
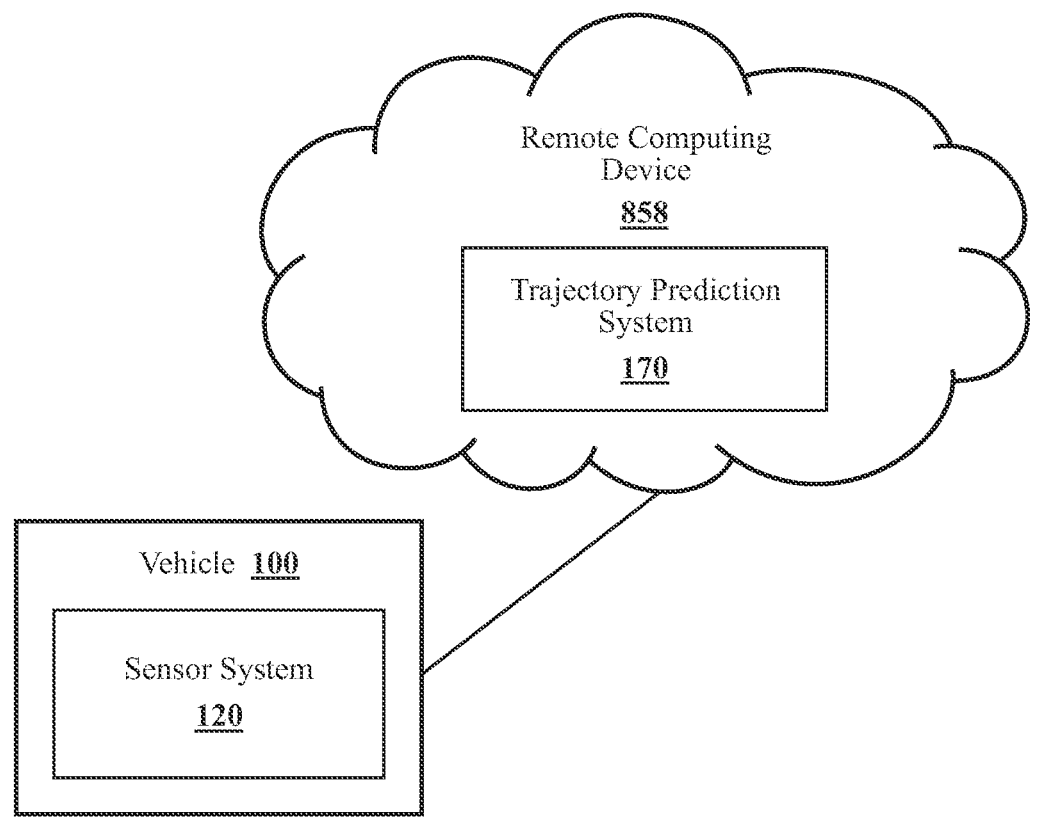

FIG. 8 illustrates one embodiment of the trajectory prediction system of FIG. 3 in a remote computing device.

DETAILED DESCRIPTION

Systems, methods, and other embodiments associated with improving future trajectory prediction based on the awareness of a driver to other vehicles in the environment are disclosed herein. As previously described, some vehicles are equipped with advanced driver assistance systems (ADAS) that provide various levels of assistance, such as anti-collision warnings, to the driver of the vehicle. In an example, an ADAS receives sensor data from the ego vehicle. From this data, an anti-collision system determines the historic tracks of the vehicles (ado and ego) and predicts the future trajectories of the vehicles. Different remedial actions may be taken based on the predicted future trajectories. For example, responsive to a prediction that two vehicles are likely to collide on account of a rearward vehicle accelerating towards a preceding vehicle that is stopped, the ADAS may generate a warning to the rearward vehicle of the impending collision such that the driver may apply brakes to avoid the collision.

While ADAS undoubtedly reduces the number of vehicle accidents and promotes user safety, these systems may rely on incorrect assumptions about the environment and the drivers of the vehicles. For example, an anti-collision system may assume that a driver is aware of the activity of adjacent vehicles and thus is prepared to act based on the activity of the adjacent vehicles. However, it may be that the driver of the ego vehicle, for whatever reason, is not attentive or aware of the activity of the adjacent vehicles or a recent maneuver of the adjacent vehicles and, as such, has an incorrect perception of the actual trajectory of the adjacent vehicles. Accordingly, any output of predicted future trajectories of the ego vehicle may not reflect what the ego vehicle driver perceives and, as such, may be of reduced relevance, for example, while generating warning notifications, etc.

As a specific example, an ego vehicle may be traveling along a road at the same speed as an ado vehicle directly in front of the ego vehicle. At a point in time, the driver of the ado vehicle may apply brakes to slow down. In this example, the anti-collision warning may be generated based on 1) the deceleration characteristics of the ado vehicle and 2) the expected ego vehicle deceleration responsive to an ego vehicle driver's detection of the illuminated brake lights on the rear of the ado vehicle. However, if the ego vehicle driver is not aware of, or attentive to, the ado vehicle, the ego vehicle driver may not decelerate as the anti-collision system predicts. In this example, providing an anti-collision warning at a time defined by an expected deceleration of the ego vehicle may be too late if the ego vehicle does not decelerate on account of not being aware that the ado vehicle is decelerating.

Some systems account for driver inattention by providing another input to a model that predicts future trajectories. That is, in general, future trajectories may be predicted by training a machine learning model on a large dataset of trajectories. When training, trajectories are randomly split into past and future trajectories. During training, a model that can best predict the future trajectory using the past track is rewarded. However, altering the inputs to the model may trigger a re-training of the model. Moreover, as the accuracy of a model is dependent upon the size of the dataset on which it is trained, it may be the case that the limited amount of available data that indicates driver attentiveness and/or driver awareness may negatively impact the reliability of the model.

Still further, such systems may be based on a general awareness level of the driver rather than whether or not the driver is aware of particular objects within the environment. For example, a driver may exhibit general awareness of an ado vehicle in front of the ego vehicle and a lack of awareness of the braking motion of an ado vehicle in another lane. A notification generated based on the distance between the ego vehicle and the next-lane ado vehicle may be spurious and distracting to the ego vehicle driver and may be unnecessary as the braking motion of the next-lane ado vehicle does not pose a threat to the ego vehicle. That is, such a system may generate numerous false positive identifications of pending threats.

To address these and other issues, the trajectory prediction system of the present application relies not only on the detected trajectories but also on the awareness of the drivers of the vehicles to their surroundings when predicting the future trajectory of the vehicles. In particular, the system includes a driver monitoring system that monitors the gaze of the driver of the ego vehicle and/or their awareness of different objects within the environment. Based on the determined gaze/awareness, the trajectory prediction system alters the input (i.e., the past track of ado vehicles) received by the prediction module. For example, sensor data of the ego vehicle may indicate that an ado vehicle has begun to coast down as the ado vehicle driver has released the accelerator pedal. Based on this coast down, the prediction module may generate a predicted trajectory for the ado vehicle. However, a driver monitoring system may indicate that the ego vehicle driver exhibited a lack of awareness of the ado vehicle at a time before the ado vehicle initiated the coast down. As such, rather than transmitting a track of the ado vehicle that includes the coast down, the trajectory prediction system may transmit an altered track of the ado vehicle that includes 1) the track of the ado vehicle up to the point when the ego vehicle driver was not aware of the ado vehicle and 2) an inferred track of the ado vehicle from the point when the ego vehicle driver exhibited a lack of awareness of the ado vehicle. The inferred track may be based on a particular trajectory model. In a particular example, the trajectory prediction system may infer that the ado vehicle travels with constant velocity and a constant trajectory from the point in time when the ego vehicle driver last was aware of the ado vehicle.

Accordingly, the disclosed approach leverages the driver's gaze to understand driver behavior. Driver gaze can be relevant to understanding driver behavior in risky situations, such as cases of visual distraction and cognitive distraction. Moreover, in some cases, the gaze of the driver can indicate what actions the driver may take in the immediate future. However, obtaining examples of such events may be difficult at the scale that modern road agents' behavior prediction models operate.

Accordingly, the present approach improves the technology in that the trajectory prediction system fine-tunes a neural network for road agents' behavior and scene prediction with counterfactual plug-ins to mimic the lapse of attention patterns seen in visual and cognitive inattention. The method performed by the trajectory prediction system includes the generation of counterfactual vehicle trajectories based on a latent state of the ego vehicle driver that describes 1) whether the ego vehicle driver is observing an ado vehicle and 2) whether the ego vehicle driver is aware of the ado vehicle.

Examples of models used to infer the ado vehicles track include a constant velocity trajectory prediction or a plug-in machine learning model track prediction of the ado vehicle and masking out the state of the ado vehicle from the prediction graph. Example modules that may be included in the trajectory prediction system include 1) a past trajectory encoder, 2) a trajectory decoder/prediction emitter, 3) a driver monitoring system with gaze and object attention estimators and/or counterfactuals, and 4) trajectory surrogates which may include validity bit replacement and dropping out with a predictive module. In an example, the driver monitoring system gaze estimates may be used with a validity bit to replace the past trajectory based on counterfactual data and then make predictions.

In an example, the training of the system includes training based on large-scale nominal driving data and abnormal attention (e.g., inattention) data. In the case of inattentiveness, the object trajectory surrogates and a validity bit may be used to replace the prediction encoding input. The system is, therefore, trained based on a combination of trajectory prediction.

In an example, the system may operate within a noisy (or not) driver monitoring signal to infer inattention. In one example, these intermediate states of inattention can be used to form a longer-horizon inattention state classifier for the ego vehicle driver.

In this way, the disclosed systems, methods, and other embodiments improve future trajectory prediction and any ADAS that relies on predicted trajectories of vehicles by providing input into the future trajectory prediction module based on what the ego vehicle driver perceives rather than the actual circumstances, such that an appropriate warning can be generated based on the ego vehicle driver's perception of the environment. As such, the present trajectory prediction system better represents the driver's working memory. Moreover, the trajectory prediction system alters an existing input into the machine-learning future trajectory prediction module rather than providing a new input to the model. As such, the present trajectory prediction system does not trigger a re-training of the model, which, as described above, may negatively impact the reliability and efficacy of a predicted future trajectory if based on a small dataset.

Figure 1:
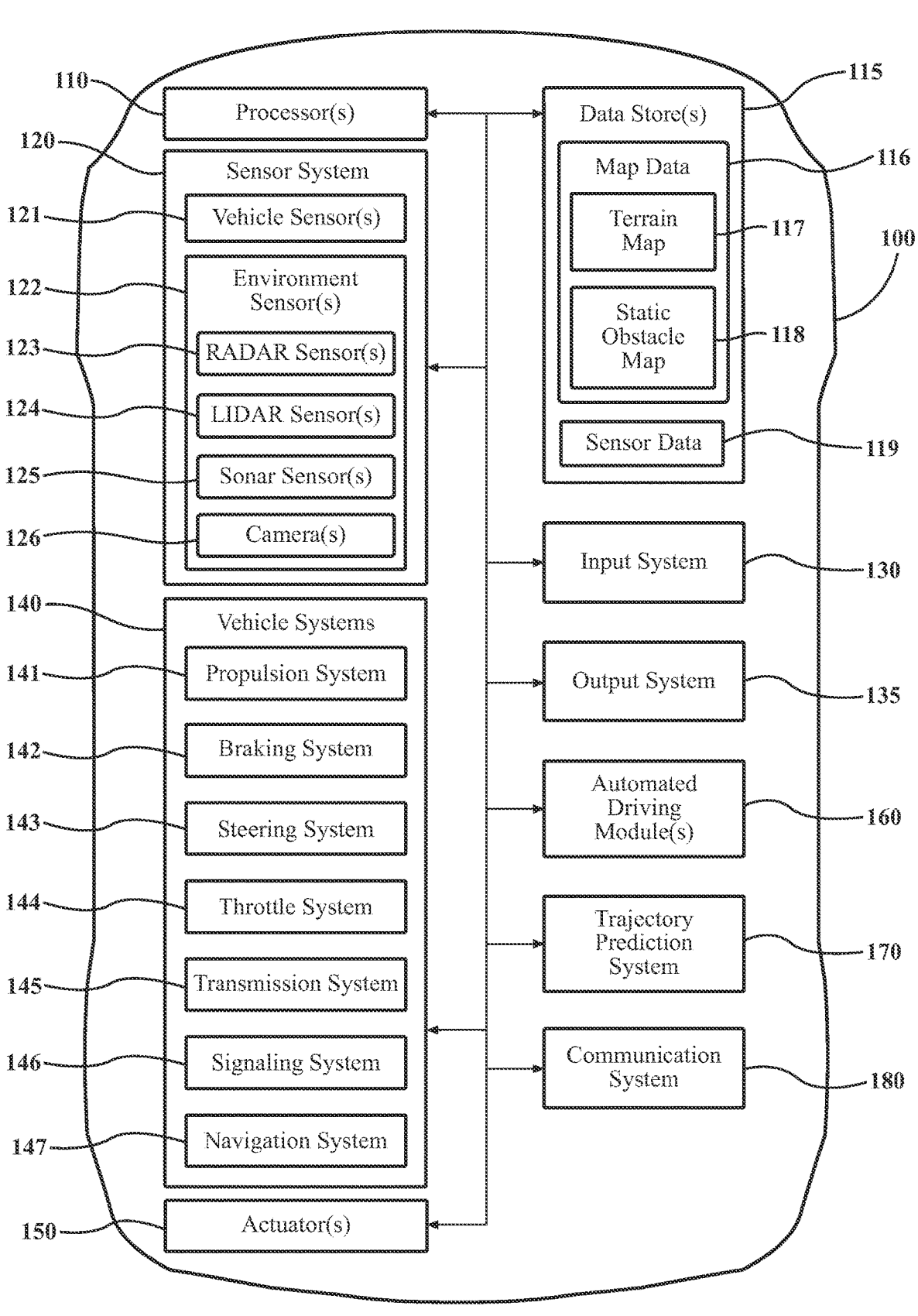
FIG. 1 illustrates one embodiment of a vehicle within which systems and methods disclosed herein may be implemented.

Referring to FIG. 1, an example of a vehicle 100 is illustrated. As used herein, a "vehicle" is any form of transport that may be motorized or otherwise powered. In one or more implementations, the vehicle 100 is an automobile. While arrangements will be described herein with respect to automobiles, it will be understood that embodiments are not limited to automobiles. In some implementations, the vehicle 100 may be a robotic device or a form of transport that, for example, includes sensors to perceive aspects of the surrounding environment, and thus benefits from the functionality discussed herein associated with generating predicted trajectories for an ado and ego vehicle based on an ego vehicle driver's attention or awareness of an ado vehicle.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 100 includes a trajectory prediction system 170 that is implemented to perform methods and other functions as disclosed herein relating to improving predicted trajectories for an ado and ego vehicle based on an ego vehicle driver's attention or awareness of an ado vehicle.

As will be discussed in greater detail subsequently, the trajectory prediction system 170, in various embodiments, may be implemented within the vehicle 100 or at a remote computing device. In either case, the trajectory prediction system 170, as provided for within the vehicle 100, functions in cooperation with a communication system 180. In the example depicted in FIG. 1, where the trajectory prediction system 170 is a part of the vehicle 100, the communication system 180 may communicate with any of the vehicle systems 140 to control the operation of the vehicle 100 in the event of a detected risk or the output system 135, for example, to generate a notification of a detected risk.

In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, dedicated short-range communication (DSRC), vehicle-to-infrastructure (V2I), vehicle-to-vehicle (V2V), or another suitable protocol for communicating between the vehicle 100 and other entities in the cloud environment. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., a cloud-based server). In any case, the trajectory prediction system 170 can leverage various wireless communication technologies to provide communications to other entities, such as members of the cloud-computing environment.

Figure 2:
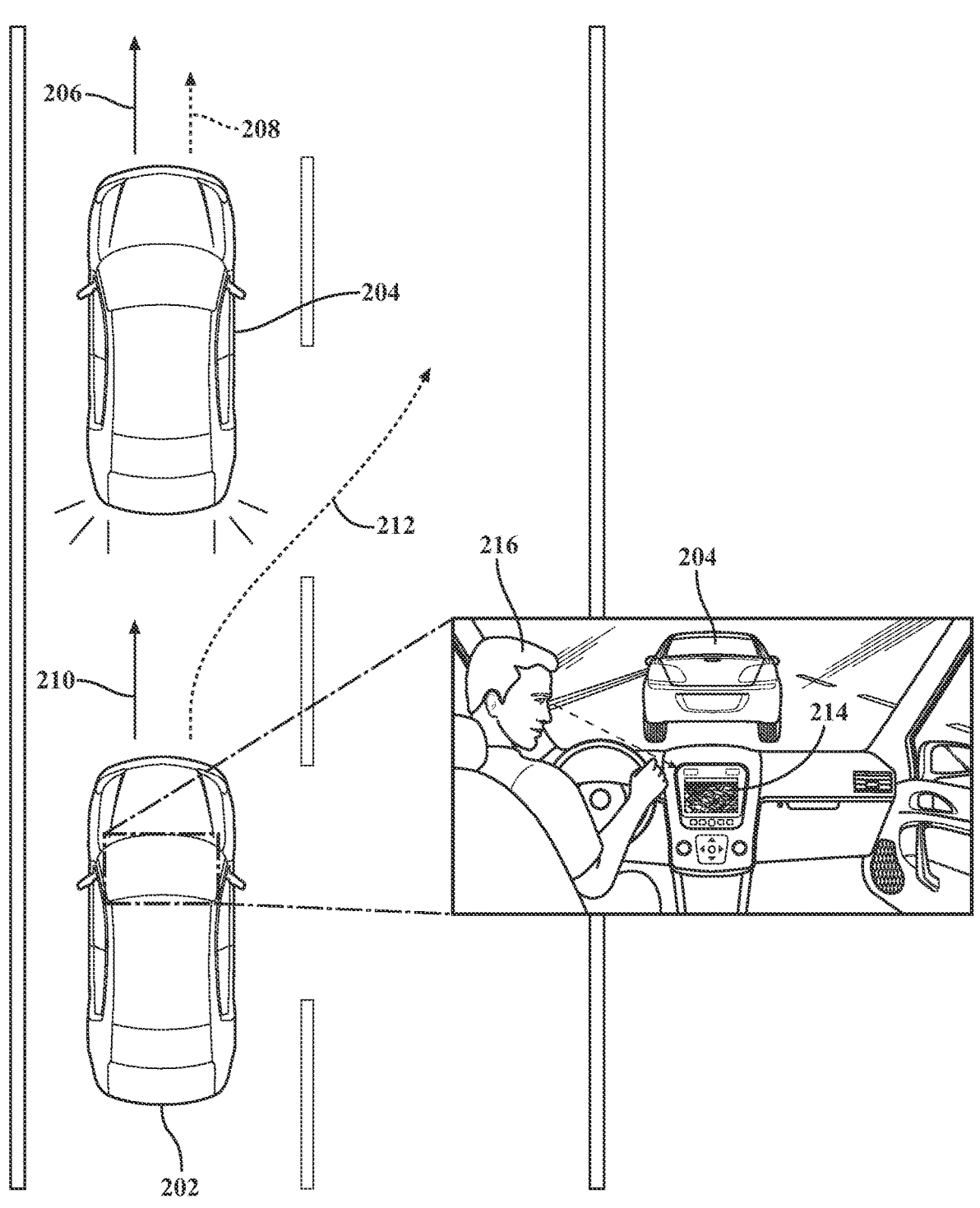
FIG. 2 illustrates an environment in which the trajectory prediction system is activated.

FIG. 2 illustrates an environment in which the trajectory prediction system 170 is activated. As described above, a prediction module of the trajectory prediction system 170 predicts the future trajectory of an ado vehicle 204 and an ego vehicle 202, both of which are examples of the vehicle 100 described in FIG. 1. The trajectories are predicted based on sensor data collected from the sensor system 120 of the ego vehicle 202. For example, sensors of the sensor system 120 perceive the environment, and the prediction module, which may include a machine-learning or neural network model, can predict the future paths of the vehicles and perform any variety of driver assistance actions. For example, an ADAS system may generate a notification or take over control of one or more of the vehicle systems 140 based on a detected impending collision of vehicles.

As described above, a prediction of future trajectories may be based on the assumption that the ego vehicle driver 216 is aware of and/or attentive to the ado vehicle 204. However, in some cases, as depicted in FIG. 2, the gaze of the driver 216 may be away from the ado vehicle, towards another object, such as an infotainment system 214 of the ego vehicle 202. In this situation, the ego vehicle driver 216 may not respond to the actions of the ado vehicle 204.

For example, the driver 216 may observe the ado vehicle 204 traveling at a first speed along a first route and may operate the ego vehicle 202 at a second speed and route that matches the ado vehicle 204 as indicated by solid lines 206 and 210. However, after the driver 216 has directed their gaze towards the infotainment system 214, the ado vehicle 204 may slow down as indicated by the shortened dashed line 208. While the sensor system 120 of the ego vehicle 202 may detect the slow down, the driver 216, on account of looking at the infotainment system 214, may not. Responsive to the slowdown, a trajectory prediction system that predicts future trajectories based on sensor data without consideration of driver awareness/attention may presume that the ego vehicle 202 will change lanes as indicated by the second dashed line 212 and thus not generate a warning through the infotainment system 214 that indicates the ado vehicle 204 reduction in speed. Thus, the notification system may not prevent a collision as the ado vehicle 204 slows down (as indicated by the first dashed line 208), and the ego vehicle 202 does not change lanes as predicted but instead maintains the second speed and route towards the ado vehicle 204.

Note that FIG. 2 and others depict the ego driver's awareness and the trajectory prediction system's 170 tracking of a single ado vehicle 204 for simplicity. However, the operations described herein may be applied to a multi-ado vehicle scenario where the trajectory prediction system 170 determines the ego vehicle driver's awareness of multiple ado vehicles 204 and alters the multiple ado vehicles predicted trajectories based on the awareness of the ego vehicle driver 216 to the respective ado vehicle 204.

With reference to FIG. 3, one embodiment of the trajectory prediction system 170 of FIG. 1 is further illustrated. The trajectory prediction system 170 is shown as including a processor 324, which may be the processor 110 from the vehicle 100 of FIG. 1 or another processor in the scenario where the trajectory prediction system 170 is located on a remote server. Accordingly, the processor 324 may be a part of the trajectory prediction system 170, the trajectory prediction system 170 may include a separate processor 324 from the processor 110 of the vehicle 100, or the trajectory prediction system 170 may access the processor 324 through a data bus or another communication path that is separate from the vehicle 100. In one embodiment, the trajectory prediction system 170 includes a memory 326 that stores a driver monitoring module 328, an alteration module 330, and a prediction module 332. The memory 326 is a random-access memory (RAM), read-only memory (ROM), a hard-disk drive, a flash memory, or another suitable memory for storing the modules 328, 330, and 332. The modules 328, 330, and 332 are, for example, computer-readable instructions that, when executed by the processor 324, cause the processor 324 to perform the various functions disclosed herein. In alternative arrangements, the modules 328, 330, and 332 are independent elements from the memory 326 that are, for example, comprised of hardware elements. Thus, the modules 328, 330, and 332 are alternatively application-specific integrated circuits (ASICs), hardware-based controllers, a composition of logic gates, or another hardware-based solution.

Moreover, in one embodiment, the trajectory prediction system 170 includes the data store 318. The data store 318 is, in one embodiment, an electronic data structure stored in the memory 326 or another data storage device and that is configured with routines that can be executed by the processor 324 for analyzing stored data, providing stored data, organizing stored data, and so on. Thus, in one embodiment, the data store 318 stores data used by the modules 328, 330, and 332 in executing various functions.

In one embodiment, the data store 318 stores the sensor data 320 used by the modules 328, 330, and 332. For example, as described above, the driver monitoring module 328 determines the awareness of the ego vehicle driver 216 to various objects in the environment. Accordingly, the sensor data 320 may include the output of in-cabin driver-facing cameras from which the driver monitoring module 328 may determine a gaze direction or awareness of the ego vehicle driver 216. The sensor data 320 may include the output of biometric sensors such as heart rate sensors, galvanic skin response sensors, brain activity sensors, or the like that monitor the driver 216 and from which an attention or cognitive load of the driver 216 may be determined.

Also, as described above, the prediction module 332, along with the trajectory prediction model 322, may predict a future trajectory of the ado vehicle(s) 204 and/or the ego vehicle 202. Accordingly, the sensor data 320 may include the output of various environment sensors 122 of the vehicle which perceive the ado vehicles 204 such that predicted trajectories of the ado vehicles 204 may be made. The sensor data 320 may also include the output of various vehicle sensors 121, as described below in connection with FIG. 1, from which a prediction of the trajectory of the ego vehicle 202 may be made. Additional details regarding the sensor system 120, the output of which may be stored as sensor data 320, are provided below in connection with the description of FIG. 1.

In one embodiment, the data store 318 stores the sensor data 320 along with, for example, metadata that characterizes various aspects of the sensor data 320. For example, the metadata can include location coordinates (e.g., longitude and latitude), relative map coordinates or tile identifiers, time/date stamps from when the separate sensor data 320 was generated, and so on.

In one embodiment, the data store 318 further includes a trajectory prediction model 322, which may be relied on by the prediction module 332 to predict the future trajectory of the ado vehicles 204 and the ego vehicle 202. In an example, the trajectory prediction system 170 may be a machine-learning system that predicts or estimates future behavior based on past behavior. In the context of the present application, a machine-learning trajectory prediction system 170 relies on some form of machine learning, whether supervised, unsupervised, reinforcement, or any other type, to predict the future trajectory of a vehicle based on the observed behaviors/trajectories of the vehicle and its surroundings. In any case, the trajectory prediction model 322 may include the weights (including trainable and non-trainable), biases, variables, offset values, algorithms, parameters, and other elements that operate to output a likely future trajectory of a vehicle based on any number of input values including sensor data 320 and a determined driver gaze/awareness of the objects within the environment.

The trajectory prediction system 170 includes a driver monitoring module 328 which, in one embodiment, includes instructions that cause the processor 324 to determine an awareness of a driver 216 of an ego vehicle 202 toward ado vehicle(s) 204 in the vicinity of the ego vehicle 202. As described above, whether or not the driver 216 is aware of the ado vehicle(s) 204 may impact the predicted trajectory of the ado vehicle(s) 204 and the predicted trajectory of the ego vehicle 202. As described above, a trajectory prediction based on the ego vehicle driver's perception of the environment may facilitate more timely and helpful driver assistance. As such, the driver monitoring module 328 monitors certain physiological characteristics of the ego vehicle driver 216 on which the altered future trajectories are based.

Specifically, in one example, the driver monitoring module 328 includes instructions that, when executed by the processor 324, cause the processor 324 to determine the awareness of the driver 216 towards the ado vehicle(s) 204 by monitoring the gaze of the driver 216 towards the ado vehicle(s) 204. That is, the driver monitoring module 328 may include instructions that analyze frames from an in-cabin driver-facing camera to evaluate the gaze direction of the driver 216 and to determine when the gaze of the driver 216 is directed towards an ado vehicle 204 identified in images of a front-facing environment sensor/camera of the ego vehicle 202. If the gaze of the driver 216 does not fall on the ado vehicle 204 to satisfy some threshold (e.g., the driver 216 does not gaze towards the ego vehicle 202 within a prescribed period, or the driver 216 does not gaze towards the ego vehicle 202 a threshold number of times within the prescribed period), the driver monitoring module 328 may determine that the driver 216 is not aware of the ado vehicle 204.

As described above, such a determination may be made on an object-by-object basis. That is, rather than determining that the driver 216 is not gazing in the general direction of the driving scene, the driver monitoring module 328 may be able to determine which regions of the general driving scene the driver 216 has observed and which regions the driver 216 has not. The region-based indication of the driver 216 gaze may be compared to identified objects in the output of a front-facing sensor to detect which objects in the environment the driver 216 has observed. For example, each object may be identified by its relative location in the image captured by a front-facing camera. The driver monitoring module 328 may identify a similar relative location of the gaze of the driver 216, and based on a comparison of such, the driver monitoring module 328 may identify which objects in the scene are the subject of the driver's 216 gaze.

In addition to determining awareness based on driver gaze direction, the driver monitoring module 328 may determine driver awareness based on additional physiological traits/behaviors. For example, the characteristics of the driver's pupils (i.e., pupillometry) may be indicative of the driver's awareness. Other examples of a driver's general awareness of an environment include heart rate, galvanic skin response, brain activity, etc. Accordingly, in these examples, the driver monitoring module 328 may retrieve this additional physiological sensor data 320 to determine the driver's awareness/attentiveness to various ado vehicles 204 in the environment. In this example, the driver monitoring module 328 further includes instructions to determine the awareness of the driver 216 to the ado vehicle(s) 204 based on additional physiological traits/behaviors of the driver 216.

In an example, the driver monitoring module 328 may output an estimation of the confidence of the determined awareness of the driver 216 to the ado vehicle(s) 204. That is, rather than providing a binary output of aware/not aware, the driver monitoring module 328 may output an indication of the reliability of the indication such that the alteration module 330 may appropriately modify the input to the prediction module.

In an example, the driver monitoring module 328 may include instructions that, when executed by the processor 324, cause the processor 324 to generate an ego driver model based on the awareness of the driver 216 to the ado vehicle(s) 204. For example, the determined state of the driver awareness may indicate a larger level of cognitive distraction of the driver 216 which may be used to further customize driver assistance. For example, if an aggregated representation of the object-specific indicia of inattentiveness or lack of awareness reaches a certain threshold, certain driver assistance measures may be deployed earlier than if the aggregated representation is below the threshold.

The trajectory prediction system 170 includes an alteration module 330 which, in one embodiment, includes instructions that cause the processor 324 to alter past track data of the ado vehicle(s) 204 based on a lack of awareness of the driver 216 towards the ado vehicle(s) 204. That is, the prediction module 332 may output an inaccurately predicted trajectory of the ado or ego vehicle if not accounting for the attention of the driver 216, or lack thereof, towards specific objects within the environment. This inaccurate predicted trajectory may negatively impact ADAS or autonomous module features that rely on a predicted trajectory. For example, assuming perfect attention, the prediction module 332, which may be a machine-learning module, may indicate that the driver 216 will slow down responsive to detected braking or coasting of an ado vehicle 204. However, if the driver 216 does not perceive the ado vehicle 204 slowing down, the driver 216 may not slow down, thus invalidating any ADAS that does not account for the driver's lack of awareness. Accordingly, the alteration module 330 alters the input to the prediction module (i.e., the past track data of the ado vehicle 204) based on the driver's 216 lack of awareness.

As one example, the alteration module 330 includes instructions to replace a portion of the past track data that is collected after the driver 216 is unaware of the ado vehicle 204 with inferred track data that is based on the ego vehicle sensor data 320 collected while the driver 216 is aware of the ado vehicle 204. That is, rather than providing the prediction module 332 with data that does not reflect the driver's 216 perception of the environment, the alteration module 330 provides the prediction module 332 with data that better represents the driver's 216 perception of the environment. In one specific example, the alteration module 330 includes instructions that cause the processor 324 to infer that the ado vehicle 204 travels with a constant velocity in a constant direction when measured while the driver 216 is aware of the ado vehicle 204. While particular reference is made to a constant velocity and direction inference, the alteration module 330 may rely on other models to infer the trajectory of the ado vehicle 204 following a point in time when the driver 216 lacks awareness of the ado vehicle 204. For example, the alteration module 330 may generate a distribution of possible paths of the ado vehicle 204 based on road features (e.g., curves, turns, traffic signals, etc.). For example, given a road with a curve, the alteration module 330 may alter the track data to infer that the ado vehicle 204 travels around the curve (thus not in a constant direction) but at a constant speed, as last observed by the driver 216.

In the event that the driver monitoring module 328 determines that the driver 216 is attentive and aware of the ado vehicle 204, the alteration module 330 may include instructions that cause the processor 324 to transmit the past track data of the ado vehicle 204 to the prediction module 332. More specifically, the alteration module 330 may transmit the past track data of the ado vehicle 204, as determined by sensor data 320 collected by the ego vehicle 202, without modification. In this example, the assumption of the prediction module 332 that the driver 216 is entirely aware of the surroundings may be reasonable and thus not negatively affect the predicted vehicle trajectories.

In either case, the alteration module 330 may include instructions that cause the processor 324 to transmit the altered track data of the ado vehicle(s) 204 to a prediction module 332 that predicts the future trajectories of the ado vehicle(s) 204 and the ego vehicle 202 based on the altered track data of the ado vehicle(s) 204 and the ego vehicle track data. As described above, trajectory prediction works by training a machine-learning model (i.e., the trajectory prediction model 322) on a large dataset of trajectories. From the dataset, the trajectory is randomly split into a past region and a future region, and the model is rewarded when the correct future trajectory is predicted based on its past component. As collected track data is received in real-time, the prediction module 332 generates a predicted trajectory based on the collected track data. However, if the collected track data does not reflect the driver's 216 perception or awareness of the environment, then any predicted trajectory may be erroneous. Accordingly, the alteration module 330 alters the collected track data, i.e., the past track data, for the ado vehicle 204 such that any predicted future trajectory of the ado vehicle 204 and/or ego vehicle 202 is more reflective of the driver's 216 awareness.

As described above, the alteration module 330 does not generate an additional input to the prediction module 332/ trajectory prediction model 322 but alters an input. Alteration of the input does not trigger re-training of the machine-learning model; instead, the input is adjusted based on an inferred physics model (e.g., constant velocity and constant direction from the point of last awareness).

In one approach, the prediction module 332 implements and/or otherwise uses a machine learning algorithm. That is, the prediction module 332 is a machine-learning model that predicts the future trajectories of the ado vehicle 204 and the ego vehicle 202 based on the altered track data and ego vehicle track data.

Figure 6:
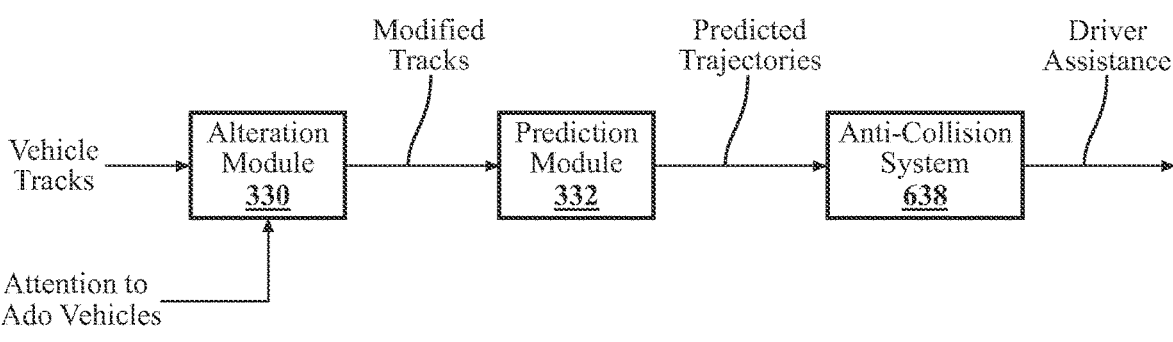
FIG. 6 illustrates one embodiment of a trajectory prediction system that is associated with generating driver awareness-based vehicle trajectory predictions.

A machine-learning algorithm generally identifies patterns and deviations based on previously unseen data. In the context of the present application, a machine-learning prediction module 332 relies on some form of machine learning, whether supervised, unsupervised, reinforcement, or any other type of machine learning, to identify patterns in past track data and predicts a future trajectory based on 1) the currently collected track data and 2) a driver awareness to the subject of the track. As such, as depicted in FIG. 6, the inputs to the prediction module 332 include the sensor data-defined tracks and the data indicative of driver awareness. The prediction module 332 relies on a mapping between past track data and future trajectory data, determined from the training set of trajectory data to predict a future trajectory based on the altered ado vehicle track.

In one configuration, the machine learning algorithm is embedded within the prediction module 332, such as a convolutional neural network (CNN) or an artificial neural network (ANN), to predict future trajectory over the altered track data for the ado vehicle 204. Of course, in further aspects, the prediction module 332 may employ different machine learning algorithms or implement different approaches for performing the future trajectory prediction, which can include logistic regression, a naïve Bayes algorithm, a decision tree, a transformer, a linear regression algorithm, a k-nearest neighbor algorithm, a random forest algorithm, a boosting algorithm, and a hierarchical clustering algorithm among others to generate predicted future trajectories. Other examples of machine learning algorithms include but are not limited to deep neural networks (DNN), including transformer networks, convolutional neural networks, recurrent neural networks (RNN), Support Vector Machines (SVM), clustering algorithms, Hidden Markov Models, and so on. It should be appreciated that the separate forms of machine learning algorithms may have distinct applications, such as agent modeling, machine perception, and so on.

Whichever particular approach the prediction module 332 implements, the prediction module 332 provides an output of predicted future trajectories of the ado vehicle 204 and/or the ego vehicle 202. In this way, any subsequent ADAS is based not on an assumption of the driver's complete awareness of the surrounding environment but on an acknowledged awareness of the driver 216 of the surrounding environment and the likely behaviors of the ego vehicle 202 based on the acknowledged awareness.

Moreover, it should be appreciated that machine learning algorithms are generally trained to perform a defined task. Thus, the training of the machine learning algorithm is understood to be distinct from the general use of the machine learning algorithm unless otherwise stated. That is, the trajectory prediction system 170 or another system generally trains the machine learning algorithm according to a particular training approach, which may include supervised training, self-supervised training, reinforcement learning, and so on. In contrast to training/learning of the machine learning algorithm, the trajectory prediction system 170 implements the machine learning algorithm to perform inference. Thus, the general use of the machine learning algorithm is described as inference.

It should be appreciated that the prediction module 332, in combination with the trajectory prediction model 322, can form a computational model such as a neural network model. In any case, the prediction module 332, when implemented with a neural network model or another model, in one embodiment, implements functional aspects of the trajectory prediction model 322 while further aspects, such as learned weights, may be stored within the data store 318. Accordingly, the trajectory prediction model 322 is generally integrated with the prediction module 332 as a cohesive functional structure.

With continued reference to FIG. 3, the driver monitoring module 328, alteration module 330, and the prediction module 332 generally include instructions that function to control the processor 324 to receive data inputs from one or more sensors of the vehicle 100. As provided for herein, the modules 328, 330, and 332, in one embodiment, acquire sensor data 320 that includes at least camera images of the surrounding environment and the driver 216. In further arrangements, the modules 328, 330, and 332 acquire the sensor data 320 from further sensors such as a radar sensor 123, a LiDAR sensor 124, and other sensors as may be suitable for identifying vehicles and locations of the vehicles.

While the modules 328 330, and 332 are discussed as controlling the various sensors to provide the sensor data 320, in one or more embodiments, the modules 328, 330, and 332 can employ other techniques to acquire the sensor data 320 that are either active or passive. For example, the modules 328, 330, and 332 may passively sniff the sensor data 320 from a stream of electronic information provided by the various sensors to further components within the vehicle 100. Moreover, the modules 328, 330, and 332 can undertake various approaches to fuse data from multiple sensors when providing the sensor data 320 and/or from sensor data acquired over a wireless communication link (e.g., v2v) from one or more of the surrounding vehicles. Thus, the sensor data 320, in one embodiment, represents a combination of perceptions acquired from multiple sensors.

As described above, the future predicted trajectory may be used in any number of driver assistance scenarios. For example, projected trajectories of the ado vehicle 204 and the ego vehicle 202 may be relied on to determine if and when to provide warnings, such as anti-collision warnings. As such, the trajectory prediction system 170 may communicate with such systems, such as a forward collision warning (FCW) system, via a communication system 180 of the vehicle 100.

Figure 4:
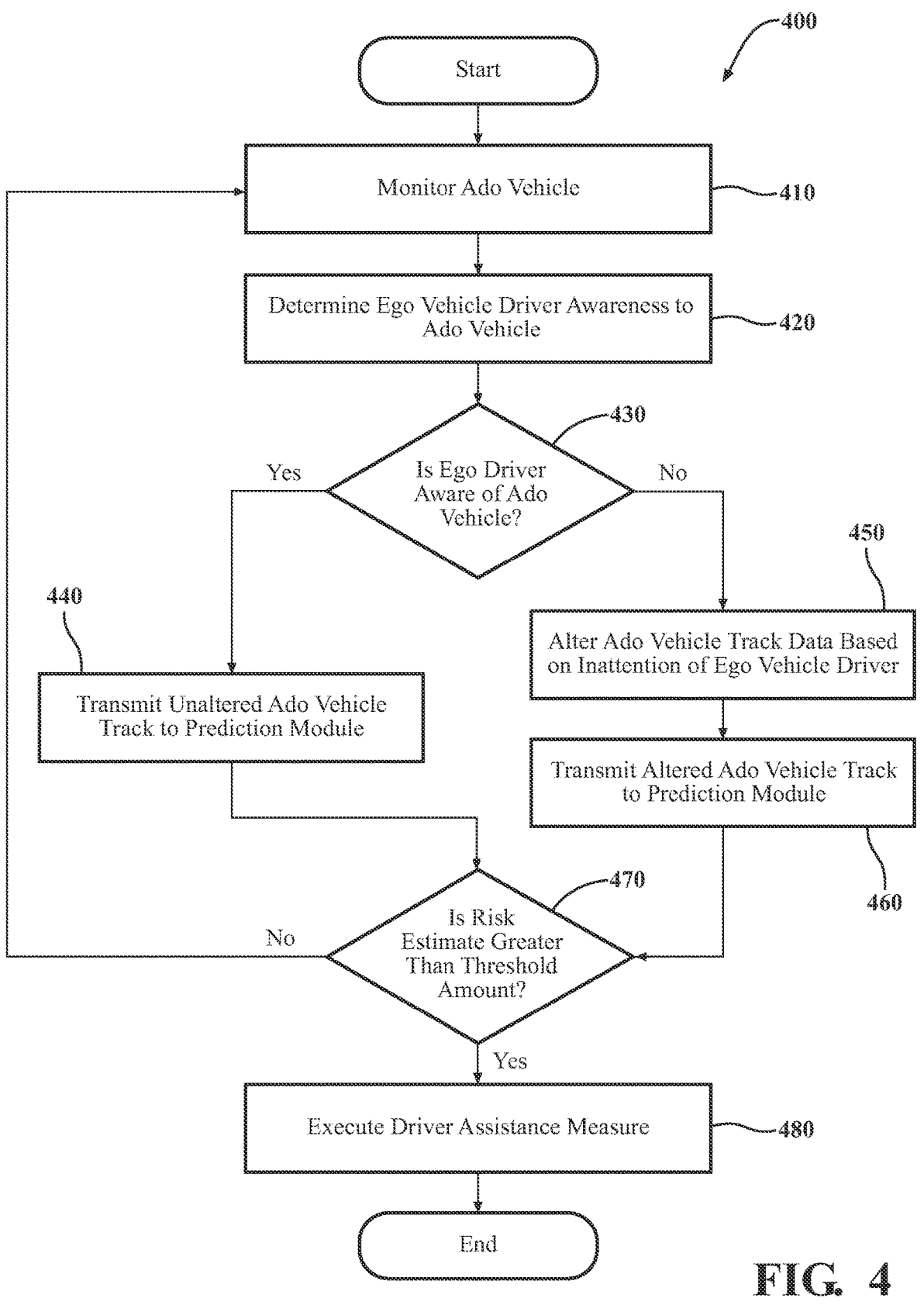
FIG. 4 illustrates a flowchart for one embodiment of a method that is associated with generating driver awareness-based vehicle trajectory predictions.

Additional aspects of generating predicted future trajectories will be discussed in relation to FIG. 4. FIG. 4 illustrates a flowchart of a method 400 that is associated with generating driver awareness-based vehicle trajectory predictions. Method 400 will be discussed from the perspective of the trajectory prediction system 170 of FIGS. 1 and 3. While method 400 is discussed in combination with the trajectory prediction system 170, it should be appreciated that the method 400 is not limited to being implemented within the trajectory prediction system 170 but is instead one example of a system that may implement the method 400.

At 410, the trajectory prediction system 170 controls the sensor system 120 to acquire the sensor data 320 and monitor the ado vehicle(s) 204. In one embodiment, the trajectory prediction system 170 controls the radar sensor 123 and the camera 126 of the ego vehicle 202 to observe the surrounding environment. Alternatively, or additionally, the trajectory prediction system 170 controls the camera 126 and the LiDAR 124 or another set of sensors to acquire the sensor data 320. Similarly, the trajectory prediction system 170 controls the sensor system to acquire vehicle sensor data from which ego vehicle trajectories are determined and in-cabin driver-facing cameras and physiological sensors from which a driver 216 awareness is determined.

Moreover, in further embodiments, the trajectory prediction system 170 controls the sensors to acquire the sensor data 320 at successive iterations or time steps. Thus, the trajectory prediction system 170, in one embodiment, iteratively executes the functions discussed at blocks 410-430 to acquire the sensor data 320 and provide information therefrom. Furthermore, the trajectory prediction system 170, in one embodiment, executes one or more of the noted functions in parallel for separate observations in order to maintain updated perceptions. Additionally, as previously noted, the trajectory prediction system 170, when acquiring data from multiple sensors, fuses the data together to form the sensor data 320 and to provide for improved determinations of detection, location, and so on.

At 420, the driver monitoring module 328 determines the driver 216 awareness of the ado vehicle(s) 204. As described above, this may be based on any number of criteria, including the gaze of the driver 216 (i.e., whether or not the driver 216 is directing their gaze towards the ado vehicle(s) 204) and/or additional physiological sensor output. As described above, determining awareness based on gaze may include determining whether or not the driver 216 has looked at the ado vehicle(s) 204, whether the driver 216 has looked at the ado vehicle(s) 204 a certain amount within a given window, or using other gaze-based criteria. For example, a driver monitoring module 328 may determine that the driver 216 is aware of an ado vehicle 204 if the driver 216 looks at the ado vehicle 204 within a threshold amount of time. In another example, the driver monitoring module 328 may determine that the driver 216 is aware of an ado vehicle 204 if the driver 216 looks at the ado vehicle 204 a threshold number of times within the threshold amount of time. That is to say, the driver monitoring system 328 may analyze gaze locations and the characteristics of the eye movement of the driver 216 to determine whether or not the driver 216 is attentive and/or aware of the various ado vehicle(s) 204 that may be in the vicinity of the driver 216.

In some examples, gaze alone may be inconclusive evidence of awareness. For example, a driver 216 may direct their gaze toward an ado vehicle 204 without being aware of it. Accordingly, additional features such as gaze duration, brain activity, heart rate, galvanic skin response, and/or other indicia of cognitive load may be relied on to determine whether the driver 216 is aware of ado vehicle(s) 204.

Figure 5:
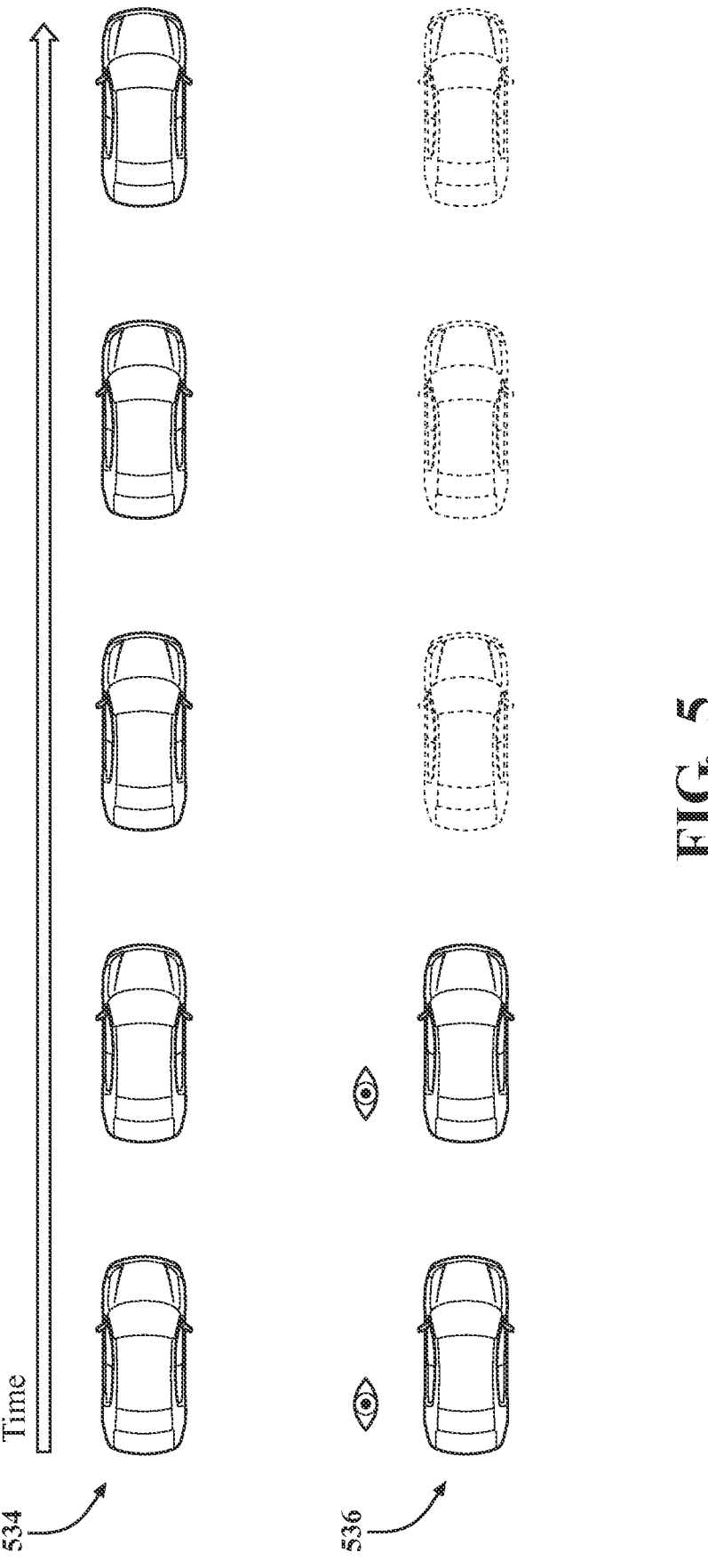
FIG. 5 illustrates altered ado vehicle track data generated by the trajectory prediction system.

At 430, based on the collected sensor data 320, the driver monitoring module 328 determines if the ego driver 216 is aware of any ado vehicle 204 in the vicinity of the driver 216. If the driver 216 is aware of an ado vehicle 204, at 440, the alteration module 330 transmits unaltered ado vehicle track data for that ado vehicle 204 to the prediction module 332. In this example, the presumption of the prediction module 332 that the driver 216 is entirely aware of the ado vehicle 204 may be a reasonable presumption. By comparison, if the driver monitoring module 328 determines that the ego driver 216 is not aware of an ado vehicle 204, at 450, the alteration module 330 alters the vehicle track of that ado vehicle based on the inattention of the ego vehicle driver 216. Specifically, as depicted in FIG. 5 below, the alteration module 330 may remove track data for an ado vehicle 204 generated after the driver 216 exhibited a lack of awareness of the ado vehicle 204 and replace the removed data with inferred track data, which inferred track data may be based on any number of inference models. At 460, the alteration module 330 may transmit the altered ado vehicle track data to the prediction module 332 to generate a driver perception-based predicted trajectory for the ado vehicle 204 and/or the ego vehicle 202.

As described above, driver assistance may be based on the predicted trajectories of the ado and the ego vehicles. For example, if an ado vehicle 204 and the ego vehicle 202 are within a threshold distance of one another such that an impending collision is predicted, a warning may be provided to the driver 216 through the output system 135. However, the timing of the provided warning may be based on an assumption that the driver 216 exhibits complete attention to the environment. However, as described above, that may not be the case. In generating the warning, the anti-collision system receives the predicted trajectories for the ego vehicle 202 and an ado vehicle 204 and estimates a risk to either vehicle based on the predicted trajectories. For example, the anti-collision system may receive the predicted trajectories and determine that if the vehicles continue along these trajectories, a collision is likely to happen. If the risk to either of the vehicles surpasses a threshold amount, the anti-collision system may issue a visual/audio warning through the ego vehicle 202 output system 135, prompting a remedial action.

Figure 7:
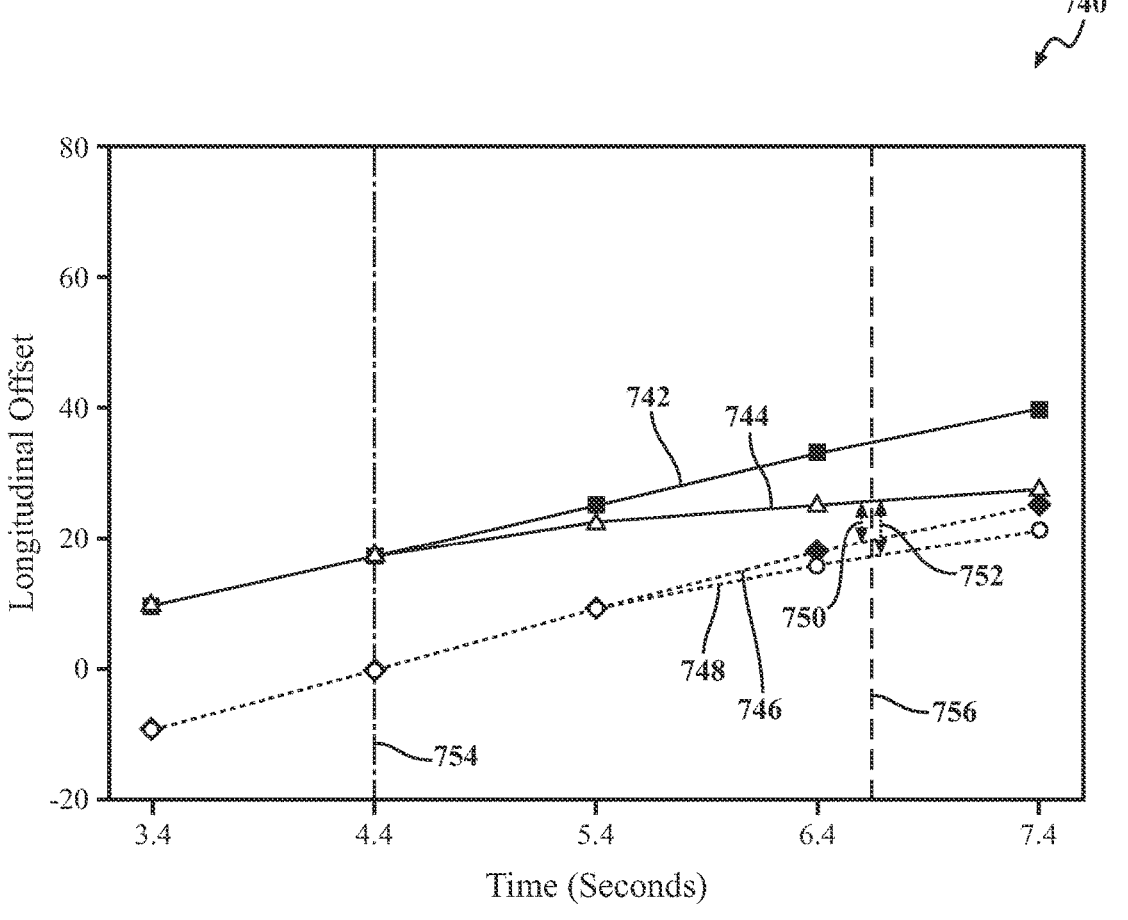
FIG. 7 illustrates a graph depicting the difference in complete attention to an ado vehicle and actual attention to an ado vehicle.

As such, the trajectory prediction system 170 may include instructions that, when executed by the processor 324, cause the processor 324 to predict a trajectory for the ego vehicle 202 based on the awareness of the driver 216 towards the ado vehicle 204. For example, a prediction module 332, assuming complete awareness on the part of the driver 216, may predict that the ego vehicle 202 will slow down in response to the slowing down of an ado vehicle 204. However, as depicted in FIG. 7 below, if the driver 216 is unaware of the slowing down of the ado vehicle 204, the predicted ego vehicle reduction in speed may be erroneous and a more accurate assumption may be that the ego vehicle 202 would likely continue along its path.

At 470, based on the predicted trajectory of the ado vehicle 204 based on the driver's 208 awareness and the predicted trajectory of the ego vehicle 202 based on the driver's awareness, the trajectory prediction system 170 may estimate a risk level to at least one of the ego vehicle 202 and the ado vehicle 204 based on the altered track data and the ego vehicle track data. If the risk level is not greater than a threshold, then the trajectory prediction system 170 continues to monitor the track of the vehicles and the awareness of the driver 216.

If the risk estimate is greater than a threshold amount, at 480, the trajectory prediction system 170 may execute a driver assistance measure, such as providing a visual or audio warning to the driver 216 of the potential risk or taking temporary control over one or more vehicle systems 140 to alleviate the risk by, for example, applying the brakes and/or moving the vehicle out of harm's way.

As described above, the present method 400 may be used to determine the driver's attention to multiple ado vehicles 204. As such, the trajectory prediction system 170 may estimate a risk level between the ego vehicle 202 and each ado vehicle 204. In this example, the maximum risk across the ado vehicles 204 may be used to determine when to execute a particular driver assistance measure.

FIG. 5 illustrates an altered ado vehicle track input generated by the trajectory prediction system 170. As described above, a prediction module 332 may predict the future trajectory of an ado vehicle 204 based on an assumption that the driver 216 is entirely aware of the ado vehicle 204. In the first instance 534, where it is assumed that the driver 216 is entirely aware of the ado vehicle 204, all data historically collected may be provided to the prediction module 332 and relied on predicting a future trajectory of the ado vehicle 204 and ego vehicle 202.

However, this may lead to an incorrect prediction of the ego vehicle driver 216 behavior as described above in connection with FIG. 2. FIG. 5 graphically depicts periods when ego vehicle sensor data representing the ado vehicle 204 is collected. Accordingly, in cases where the driver 216 is determined to be unaware of the ado vehicle 204, as indicated by the second instance 536, just those data points (indicated in solid lines) collected before the point in time when the driver 216 exhibits a lack of awareness of the ado vehicle 204 are used by the prediction module 332. For sensor data 320 collected after the driver 216 is deemed unaware (those data points indicated in dashed lines), the track of the ado vehicle 204 is inferred. That is, the alteration module 330 includes instructions that, when executed by the processor 324, cause the processor 324 to replace a portion of the past track data that is collected after the driver 216 is unaware of the ado vehicle 204 with inferred track data that is based on ego vehicle sensor data collected while the driver 216 is aware of the ado vehicle 204.

As described above, the inference may be that the ado vehicle 204 travels with a constant velocity in a constant direction as measured while the driver 216 is aware of the ado vehicle 204. That is, it may be that the driver 216, who is unaware of the ado vehicle 204, assumes that the ado vehicle 204 continues along its path at the last observed velocity.

In one example, the model upon which the ado vehicle 204 track is inferred may include additional considerations. For example, due to environmental conditions, cognitive load, etc., it may take a few milliseconds for a driver's 216 brain to fully be aware of the ado vehicle 204. Accordingly, the alteration module 330 may be trained to incorporate a lag or delay from when the driver's gaze falls on the ado vehicle 204 to a determination that the driver 216 is fully aware of the ado vehicle.

Moreover, while the present specification describes constant velocity and constant direction inferred track data, the alteration module 330 may rely on other models to infer the track of the ado vehicle 204 following the lack of awareness of the driver 216 to the ado vehicle 204. For example, the alteration module 330 may be a machine-learning module that predicts how a driver would respond without an actual observation of the ado vehicle 204.

FIG. 6 illustrates one embodiment of a trajectory prediction system 170 that is associated with generating driver awareness-based vehicle trajectory predictions. Specifically, FIG. 6 depicts the prediction module 332, which in one embodiment with the trajectory prediction model 322, administers a machine learning algorithm to generate a predicted trajectory of ado vehicle(s) 204 and/or an ego vehicle 202, which predicted trajectories may trigger a downstream system, such as an anti-collision system 638 to generate a driver assistance function, such as a notification and/or vehicle control.

As described above, the machine-learning model may take various forms, including a machine-learning model that is supervised, unsupervised, or reinforcement-trained. In one particular example, the machine-learning model may be a neural network that includes any number of 1) input nodes that receive modified tracks, 2) hidden nodes, which may be arranged in layers connected to input nodes and/or other hidden nodes, and which include computational instructions for computing outputs, and 3) output nodes connected to the hidden nodes which generate an output indicative of the predicted trajectories of the vehicles.

As described above, rather than generating an additional input to the machine-learning prediction module 332, which may trigger additional training of the machine-learning system, the present trajectory prediction system 170 instead alters the inputs, i.e., the modified tracks based on determined driver awareness and a physics model (i.e., inferred ado vehicle track).

FIG. 7 illustrates a graph 740 depicting the difference in complete attention of the driver 216 to an ado vehicle 204 and the actual attention of the driver 216 to an ado vehicle 204. In the example depicted in FIG. 7, the x-axis depicts time, and the y-axis depicts longitudinal position.

A first line 742 represents the predicted trajectory of the ado vehicle 204 given the ego vehicle driver's 216 lack of attention towards the ado vehicle 204 beginning at a first point in time 754 and a second line 744 represents the actual trajectory of the ado vehicle 204. A third line 746 represents the ego vehicle 202 predicted trajectory that accounts for the driver's 216 lack of awareness, while a fourth line 748 represents a predicted trajectory for the ego vehicle 202 that does not account for the driver's 208 lack of awareness (i.e., assuming the driver 216 will slow down as the ado vehicle 204 slows down).

That is, as depicted in FIG. 7, over time, the ado vehicle 204 begins to slow down, as indicated by the second line 744. However, as the slowing down occurs after the driver 216 is unaware of the ado vehicle 204 (i.e., after a first point in time 754), the trajectory that the driver 216 expects the ado vehicle 204 to follow (as indicated by the first line 742), is different than the actual ado vehicle 204 trajectory (as indicated by the second line 744). In this example, a trajectory prediction system that does not account for driver awareness may predict that the ego vehicle 202 will follow a similar path to that of the ado vehicle 204, i.e., that the ego vehicle 202 will slow down similar to the ado vehicle 204 as indicated by the fourth line 748. As such, at a second point in time 756, the difference 752 between the actual ado vehicle 204 trajectory (i.e., the second line 744) and the predicted ego vehicle 202 trajectory (i.e., the fourth line 748) may be significant enough that the system does not produce an anti-collision warning.

However, the actual difference 750 between the actual ado vehicle trajectory (i.e., the second line 744) and the actual trajectory of the ego vehicle 202 (i.e., the third line 746) may be smaller. Even though the second difference 750 is smaller, the system may not account for the driver 216 not slowing down and, therefore, may not generate a warning. The lack of a generated warning could pose a danger to the ego vehicle 202 and/or the ado vehicle 204 and any occupants and, in some cases, other motorists/bystanders in the vicinity of the vehicles. As such, the present trajectory prediction system 170, by accounting for the driver awareness, may generate a warning at the second point in time 756, based on the accurately predicted trajectory of the ego vehicle 202 (i.e., the third line 746) being below a threshold distance away from the accurately predicted trajectory of the ado vehicle 204 (i.e., the second line 744).

FIG. 8 illustrates one embodiment of the trajectory prediction system 170 of FIG. 3 in a remote computing device 858. As described above, in some examples, the trajectory prediction system 170 may be disposed on a vehicle 100, of which the ego vehicle 202 and the ado vehicle 204 are examples. In another example, the trajectory prediction system 170 may be disposed on a remote computing device 858, in which case information is transmitted to and from the vehicle 100 via the communication system 180. That is, the sensor data 320 indicative of the ado vehicle 204, the ego vehicle 202, and the ego vehicle driver 216 is received from a vehicle 100 via the communication system 180 described and depicted above.

FIG. 1 will now be discussed in full detail as an example environment within which the system and methods disclosed herein may operate. In some instances, the vehicle 100 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 100 as manipulated by a user (e.g., human driver). In one or more arrangements, the vehicle 100 can be a manually-controlled vehicle that is configured to operate in only the manual mode.

In one or more arrangements, the vehicle 100 implements some level of automation in order to operate autonomously or semi-autonomously. As used herein, automated control of the vehicle 100 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 100 along a travel route via a computing system to control the vehicle 100 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 100.

With continued reference to the various components illustrated in FIG. 1, the vehicle 100 includes one or more processors 110. In one or more arrangements, the processor(s) 110 can be a primary/centralized processor of the vehicle 100 or may be representative of many distributed processing units. For instance, the processor(s) 110 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 100.

The vehicle 100 can include one or more data stores 115 for storing one or more types of data. The data store 115 can be comprised of volatile and/or non-volatile memory. Examples of memory that may form the data store 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 115 is a component of the processor(s) 110. In general, the data store 115 is operatively connected to the processor(s) 110 for use thereby. The term "operatively connected," as used throughout this description, can include direct or indirect connections, including connections without direct physical contact.

In one or more arrangements, the one or more data stores 115 include various data elements to support functions of the vehicle 100, such as semi-autonomous and/or autonomous functions. Thus, the data store 115 may store map data 116 and/or sensor data 119. The map data 116 includes, in at least one approach, maps of one or more geographic areas. In some instances, the map data 116 can include information about roads (e.g., lane and/or road maps), traffic control devices, road markings, structures, features, and/or landmarks in the one or more geographic areas. The map data 116 may be characterized, in at least one approach, as a high-definition (HD) map that provides information for autonomous and/or semi-autonomous functions.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. In one or more arrangements, the map data 116 includes one or more static obstacle maps 118. The static obstacle map(s) 118 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 119 is data provided from one or more sensors of the sensor system 120. Thus, the sensor data 119 may include observations of a surrounding environment of the vehicle 100 and/or information about the vehicle 100 itself. In some instances, one or more data stores 115 located onboard the vehicle 100 store at least a portion of the map data 116 and/or the sensor data 119. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 120 and/or the one or more sensors can be operatively connected to the processor(s) 110, the data store(s) 115, and/or another element of the vehicle 100.

Various examples of different types of sensors will be described herein. However, it will be understood that the embodiments are not limited to the particular sensors described. In various configurations, the sensor system 120 includes one or more vehicle sensors 121 and/or one or more environment sensors. The vehicle sensor(s) 121 function to sense information about the vehicle 100 itself. In one or more arrangements, the vehicle sensor(s) 121 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 100.

As noted, the sensor system 120 can include one or more environment sensors 122 that sense a surrounding environment (e.g., external) of the vehicle 100 and/or, in at least one arrangement, an environment of a passenger cabin of the vehicle 100. For example, the one or more environment sensors 122 sense the surrounding environment of the vehicle 100. Such obstacles may be stationary objects and/or dynamic objects. Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 includes one or more radar sensors 123, one or more LIDAR sensors 124, one or more sonar sensors 125 (e.g., ultrasonic sensors), and/or one or more cameras 126 (e.g., monocular, stereoscopic, RGB, infrared, etc.).

Continuing with the discussion of elements from FIG. 1, the vehicle 100 can include an input system 130. The input system 130 generally encompasses one or more devices that enable the acquisition of information by a machine from an outside source, such as an operator. The input system 130 can receive an input from a vehicle passenger (e.g., a driver/operator and/or a passenger). Additionally, in at least one configuration, the vehicle 100 includes an output system 135. The output system 135 includes, for example, one or more devices that enable information/data to be provided to external targets (e.g., a person, a vehicle passenger, another vehicle, another electronic device, etc.).

Furthermore, the vehicle 100 includes, in various arrangements, one or more vehicle systems 140. Various examples of the one or more vehicle systems 140 are shown in FIG. 1. However, the vehicle 100 can include a different arrangement of vehicle systems. It should be appreciated that although particular vehicle systems are separately defined, each or any of the systems or portions thereof may be otherwise combined or segregated via hardware and/or software within the vehicle 100. As illustrated, the vehicle 100 includes a propulsion system 141, a braking system 142, a steering system 143, a throttle system 144, a transmission system 145, a signaling system 146, and a navigation system 147.

The navigation system 147 can include one or more devices, applications, and/or combinations thereof to determine the geographic location of the vehicle 100 and/or to determine a travel route for the vehicle 100. The navigation system 147 can include one or more mapping applications to determine a travel route for the vehicle 100 according to, for example, the map data 116. The navigation system 147 may include or at least provide connection to a global positioning system, a local positioning system or a geolocation system.

In one or more configurations, the vehicle systems 140 function cooperatively with other components of the vehicle 100. For example, the processor(s) 110, the trajectory prediction system 170, and/or automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the navigation and/or maneuvering of the vehicle 100. The processor(s) 110, the trajectory prediction system 170, and/or the automated driving module(s) 160 may control some or all of these vehicle systems 140.

For example, when operating in the autonomous mode, the processor(s) 110, the trajectory prediction system 170, and/or the automated driving module(s) 160 control the heading and speed of the vehicle 100. The processor(s) 110, the trajectory prediction system 170, and/or the automated driving module(s) 160 cause the vehicle 100 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 100 includes one or more actuators 150 in at least one configuration. The actuators 150 are, for example, elements operable to move and/or control a mechanism, such as one or more of the vehicle systems 140 or components thereof responsive to electronic signals or other inputs from the processor(s) 110 and/or the automated driving module(s) 160. The one or more actuators 150 may include motors, pneumatic actuators, hydraulic pistons, relays, solenoids, piezoelectric actuators, and/or another form of actuator that generates the desired control.

As described previously, the vehicle 100 can include one or more modules, at least some of which are described herein. In at least one arrangement, the modules are implemented as non-transitory computer-readable instructions that, when executed by the processor 110, implement one or more of the various functions described herein. In various arrangements, one or more of the modules are a component of the processor(s) 110, or one or more of the modules are executed on and/or distributed among other processing systems to which the processor(s) 110 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 100 may include one or more automated driving modules 160. The automated driving module(s) 160, in at least one approach, receive data from the sensor system 120 and/or other systems associated with the vehicle 100. In one or more arrangements, the automated driving module(s) 160 use such data to perceive a surrounding environment of the vehicle. The automated driving module(s) 160 determine a position of the vehicle 100 in the surrounding environment and map aspects of the surrounding environment. For example, the automated driving module(s) 160 determines the location of obstacles or other environmental features including traffic signs, trees, shrubs, neighboring vehicles, pedestrians, etc.

The automated driving module(s) 160 either independently or in combination with the trajectory prediction system 170 can be configured to determine travel path(s), current autonomous driving maneuvers for the vehicle 100, future autonomous driving maneuvers and/or modifications to current autonomous driving maneuvers based on data acquired by the sensor system 120 and/or another source. In general, the automated driving module(s) 160 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
determine an awareness of a driver of an ego vehicle to an ado vehicle in a vicinity of the ego vehicle;
alter past track data of the ado vehicle based on a lack of awareness of the driver towards the ado vehicle; and
transmit altered track data of the ado vehicle to a prediction module, the prediction module predicts a future trajectory of the ado vehicle based on the altered track data and a future trajectory of the ego vehicle based on the altered track data and ego vehicle track data.

2. The system of claim 1, wherein the machine-readable instructions further comprise machine-readable instructions that, when executed by the processor, cause the processor to:
predict a trajectory for the ego vehicle based on the awareness of the driver towards the ado vehicle;
estimate a risk level to at least one of the ego vehicle and the ado vehicle based on the altered track data and the ego vehicle track data; and
execute a driver assistance measure based on the risk level being greater than a threshold.

3. The system of claim 1, wherein the prediction module is a machine-learning model that predicts the future trajectories of the ado vehicle and the ego vehicle.

4. The system of claim 1, wherein the machine-readable instructions further comprise a machine-readable instruction that, when executed by the processor, causes the processor to transmit the past track data of the ado vehicle to the prediction module responsive to a determination that the driver is aware of the ado vehicle.

5. The system of claim 1, wherein the machine-readable instruction that, when executed by the processor, causes the processor to alter the past track data of the ado vehicle comprises a machine-readable instruction that, when executed by the processor, causes the processor to replace a portion of the past track data that is collected after the driver is unaware of the ado vehicle with inferred track data that is based on ego vehicle sensor data collected while the driver is aware of the ado vehicle.

6. The system of claim 5, wherein the machine-readable instructions further comprise a machine-readable instruction that, when executed by the processor, causes the processor to infer that the ado vehicle travels with a constant velocity in a constant direction as when measured while the driver is aware of the ado vehicle.

7. The system of claim 1, wherein the machine-readable instruction that, when executed by the processor, causes the processor to determine the awareness of the driver to the ado vehicle comprises a machine-readable instruction that, when executed by the processor, causes the processor to monitor a gaze of the driver towards the ado vehicle.

8. The system of claim 7, wherein the machine-readable instruction that, when executed by the processor, causes the processor to determine the awareness of the driver to the ado vehicle further comprises a machine-readable instruction that, when executed by the processor, causes the processor to determine, based on additional physiological behaviors of the driver, whether the driver is aware of the ado vehicle.

9. The system of claim 1, wherein the machine-readable instruction that, when executed by the processor, causes the processor to transmit altered track data of the ado vehicle to the prediction module, further comprises a machine-readable instruction that, when executed by the processor, causes the processor to transmit an estimation of confidence in the awareness of the driver to the ado vehicle.

10. The system of claim 1, wherein the machine-readable instructions further comprise a machine-readable instruction that, when executed by the processor, causes the processor to generate an ego driver model based on the awareness of the driver to the ado vehicle.

11. A non-transitory machine-readable medium comprising instructions that, when executed by a processor, cause the processor to:
determine an awareness of a driver of an ego vehicle to an ado vehicle in a vicinity of the ego vehicle;
alter past track data of the ado vehicle based on a lack of awareness of the driver towards the ado vehicle; and
transmit altered track data of the ado vehicle to a prediction module, the prediction module predicts a future trajectory of the ado vehicle based on the altered track data and a future trajectory of the ego vehicle based on the altered track data and ego vehicle track data.

12. The non-transitory machine-readable medium of claim 11, wherein the non-transitory machine-readable medium further comprises machine-readable instructions that, when executed by the processor, cause the processor to:
predict a trajectory for the ego vehicle based on the awareness of the driver towards the ado vehicle;
estimate a risk level to at least one of the ego vehicle and the ado vehicle based on the altered track data and the ego vehicle track data; and
execute a driver assistance measure based on the risk level being greater than a threshold.

13. The non-transitory machine-readable medium of claim 11, wherein the prediction module is a machine-learning model that predicts the future trajectories of the ado vehicle and the ego vehicle.

14. The non-transitory machine-readable medium of claim 11, wherein the instruction that, when executed by the processor, causes the processor to alter the past track data of the ado vehicle comprises an instruction that, when executed by the processor, causes the processor to replace a portion of the past track data that is collected after the driver is unaware of the ado vehicle with inferred track data that is based on ego vehicle sensor data collected while the driver is aware of the ado vehicle.

15. The non-transitory machine-readable medium of claim 14, wherein the instructions further comprise an instruction that, when executed by the processor, causes the processor to infer that the ado vehicle travels with a constant velocity in a constant direction as when measured while the driver is aware of the ado vehicle.

16. A method, comprising:
determining an awareness of a driver of an ego vehicle to an ado vehicle in a vicinity of the ego vehicle;
altering past track data of the ado vehicle based on a lack of awareness of the driver towards the ado vehicle; and
transmitting altered track data of the ado vehicle to a prediction module, the prediction module predicts a future trajectory of the ado vehicle based on the altered track data and a future trajectory of the ego vehicle based on the altered track data and ego vehicle track data.

17. The method of claim 16, further comprising:

predicting a trajectory for the ego vehicle based on the awareness of the driver towards the ado vehicle;

estimating a risk level to at least one of the ego vehicle and the ado vehicle based on the altered track data and the ego vehicle track data; and executing a driver assistance measure based on the risk level being greater than a threshold.

18. The method of claim 16, wherein altering the past track data of the ado vehicle comprises replacing a portion of the past track data that is collected after the driver is unaware of the ado vehicle with inferred track data that is based on ego vehicle sensor data collected while the driver is aware of the ado vehicle.

19. The method of claim 16, further comprising, predicting via machine-learning at the prediction module, the future trajectories of the ado vehicle and the ego vehicle.

20. The method of claim 16, wherein determining the awareness of the driver to the ado vehicle comprises monitoring a gaze of the driver towards the ado vehicle.

\*    \*    \*    \*    \*